(12) United States Patent
Cleaver et al.

(10) Patent No.: US 11,132,692 B2
(45) Date of Patent: Sep. 28, 2021

(54) SHARED VOTING FOR ACCOUNTING

(71) Applicant: International Business Machines Corporation, Armonk, NY (US)

(72) Inventors: James David Cleaver, Grose Wold (AU); Thuy Luong, Danbury, CT (US); Michael James McGuire, Beaumont Hills (AU); Ronald George Gottschalk, The Basin (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/296,535

(22) Filed: Mar. 8, 2019

(65) Prior Publication Data

US 2020/0286089 A1 Sep. 10, 2020

(51) Int. Cl.
*G06Q 20/40* (2012.01)
(52) U.S. Cl.
CPC .................. *G06Q 20/405* (2013.01)
(58) Field of Classification Search
CPC .................................................. G06Q 20/405
See application file for complete search history.

(56) References Cited

U.S. PATENT DOCUMENTS

| | | | | |
|---|---|---|---|---|
| 5,870,739 A * | 2/1999 | Davis, III | ............... | G06F 16/22 |
| 6,226,624 B1 | 5/2001 | Watson et al. | | |
| 7,319,986 B2 | 1/2008 | Praisner et al. | | |
| 8,712,887 B2 | 4/2014 | DeGroeve et al. | | |
| 2006/0186192 A1* | 8/2006 | Nelson | .................... | G06Q 20/10 235/379 |
| 2007/0156670 A1* | 7/2007 | Lim | ..................... | G06F 21/6218 |
| 2012/0191584 A1* | 7/2012 | Blount | ................... | G06Q 40/04 705/35 |
| 2012/0221464 A1* | 8/2012 | Pasquero | .......... | H04W 12/0804 705/39 |
| 2013/0197983 A1* | 8/2013 | Vel | ..................... | G06Q 30/0282 705/14.16 |
| 2014/0304157 A1* | 10/2014 | Bachenheimer | ... | G06Q 20/4016 705/44 |
| 2016/0267487 A1 | 9/2016 | Atagun et al. | | |
| 2018/0012147 A1* | 1/2018 | Hammad | ............... | G06Q 10/00 |
| 2018/0068389 A1 | 3/2018 | Pessin | | |
| 2018/0115551 A1* | 4/2018 | Cole | ....................... | H04L 41/18 |

(Continued)

OTHER PUBLICATIONS

Dunne, "Simplifying Multi-Party Transactions," IR.com, Jun. 11, 2015, 3 pages, <https://www.ir.com/blog/simplifying-multi-party-transactions>.

(Continued)

*Primary Examiner* — Scott C Anderson
(74) *Attorney, Agent, or Firm* — Grant M. McNeilly

(57) ABSTRACT

A method includes receiving, by a backend application, a request for a transaction from a frontend application, and determining, by the backend application, that the request is approved according to an approval policy. The method also includes creating, by the backend application, a single-use account, and requesting, by the backend application, a single-use code for the single-use account from a financial institution. The method also includes receiving, by the backend application, the single-use code, and sending, by the backend application, the single-use code to the frontend application.

19 Claims, 7 Drawing Sheets

(56) References Cited

U.S. PATENT DOCUMENTS

2018/0205725 A1\* 7/2018 Cronkright ........... H04L 9/3228
2018/0232720 A1 8/2018 Robeen et al.

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Weber et al., "Authenticating Financial Accounts," IP.com Prior Art Database Technical Disclosure, IP.com No. PCOM000251355D, Oct. 30, 2017, 8 pages. <https://priorart.ip.com/IPCOM/000251355>.

\* cited by examiner

SHARED VOTING FOR ACCOUNTING

BACKGROUND

Many organizations, large or small, such as businesses, clubs, and interest groups, have expenses and monetary funds to pay for them. Traditionally, these organizations have rigid rules about their money, and have strict policies in place for how it can be spent. For example, there may be a rule that only a particular individual or members of a committee are allowed to make purchases, although these people may have access to the entire treasury of the organization. For another example, there may be a series of approvals that must be sought and issued before an expense can be incurred, which can take an extended period of time to accomplish. Such traditional systems can include too few or too many obstacles to overcome before being permitted access to an organization's money.

SUMMARY

According to some embodiments of the present disclosure, a method includes receiving, by a backend application, a request for a transaction from a frontend application, and determining, by the backend application, that the request is approved according to an approval policy. The method also includes creating, by the backend application, a single-use account, and requesting, by the backend application, a single-use code for the single-use account from a financial institution. The method also includes receiving, by the backend application, the single-use code, and sending, by the backend application, the single-use code to the frontend application.

According to some embodiments of the present disclosure, a method includes receiving, by a frontend application, a request for a transaction from a first user of a plurality of users. The method also includes requesting, by the frontend application, approval for the transaction from a backend application, and receiving and storing, by the frontend application, a code for a single-use account from the backend application, wherein the single-use account originates from a financial institution in communication with the backend application. The method also includes presenting, by the frontend application, the code for completing a transaction, and recording, by the frontend application, the completed transaction.

According to some embodiments of the present disclosure, a system including a first computing device connected to a second computing device, wherein the first computing device includes a first processor configured to: receive a request for a transaction from a user; request approval for the transaction from the second computing device; receive and store a single-use code for a single-use account from the second computing device, wherein the single-use account originates from a financial institution in communication with the second computing device; present the code for completing a transaction; and record the completed transaction. The second computing device includes a second processor and is connected to the financial institution, and the second processor is configured to: receive the request for the transaction from the first computing device; determine that the request is approved according to an approval policy; create the single-use account; request the single-use code for the single-use account from the financial institution; receive the single-use code; and send the single-use code to the first computing device.

DETAILED DESCRIPTION

Figure 1:
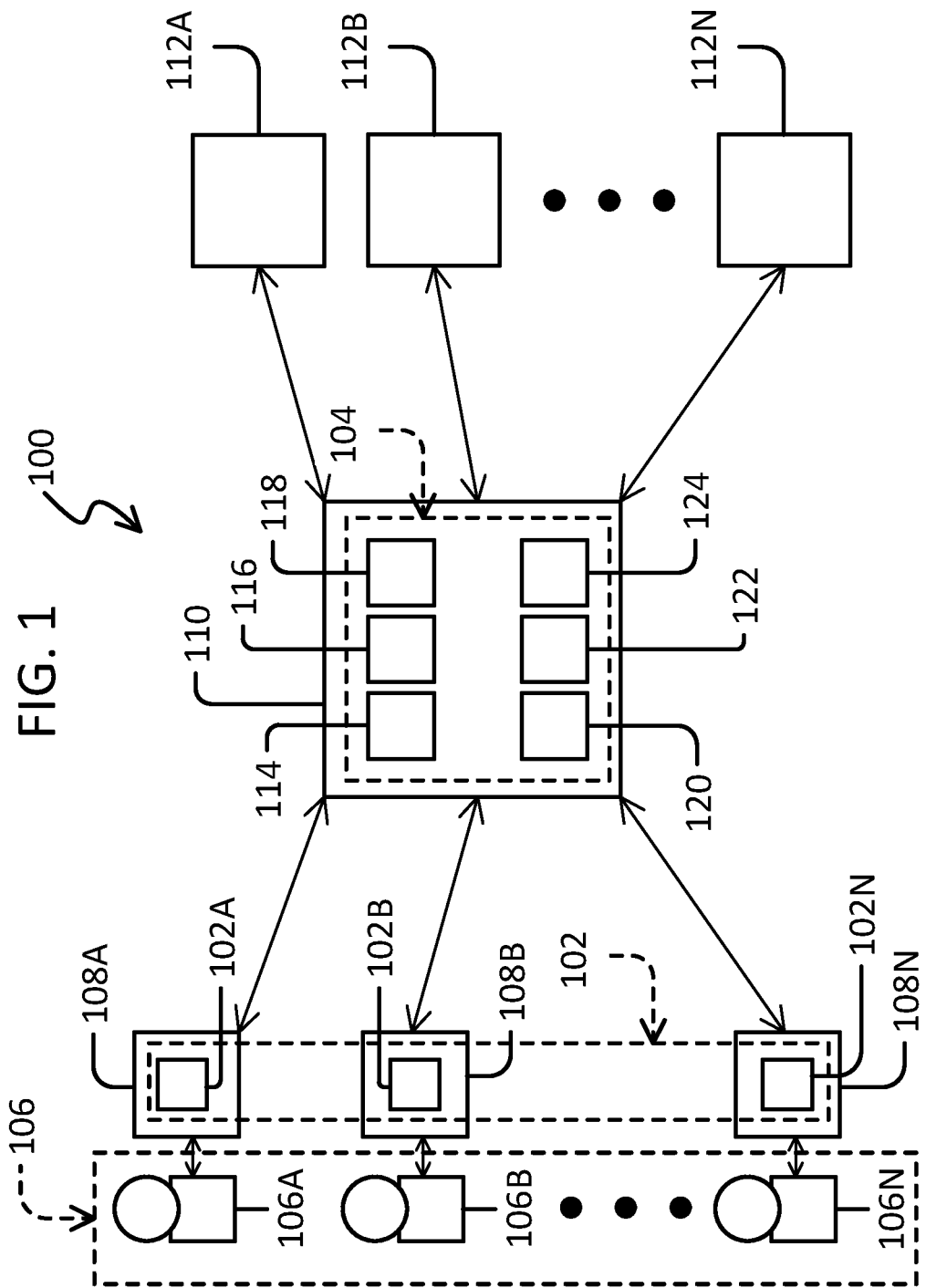
FIG. 1 shows a schematic view for a shared voting system for accounting according to embodiments of the present disclosure.

FIG. 1 shows a schematic view for shared voting system 100 for accounting according to embodiments of the present disclosure. Voting system 100 includes frontend application 102 communicatively connected to backend application 104. In the illustrated embodiment, each user 106A-106N of cohort 106 has one of devices 108A-108N (collectively "devices 108"), on which is running an instance of frontend application 102A-102N. Furthermore, backend application 104 is running on server 110 and is communicatively connected to one or more financial institutions, such as credit providers 112A-112N (collectively "credit providers 112"). Backend application 104 includes contribution module 114, request module 116, approval module 118, payment module 120, apportion module 122, and transaction module 124.

In general, shared voting system 100 allows cohort 106 to contribute to fund, manage, and use one or more joint financial account(s) ("JFA", not shown) at one or more credit providers 112 (or at other financial institutions). Such capability can be beneficial in many different contexts, for example, in a club or interest group, in a family, and in a business.

More specifically, shared voting system 100 allows users 106A-106N to interact with backend application 104 via frontend application 102. Shared voting system 100 also allows backend application to interact with credit providers 112A-112N. Thereby, if one or more users 106A-106N (for example, user 106A) has a need or desire to use credit or money that is collectively under the control of cohort 106, then shared voting system 100 allows for user 106B (for example) to request approval of a transaction. Shared voting system 100 further allows cohort 106 to approve the request, for one or more credit providers 112A-112N to be instructed to set up a single-use account ("SUA", not shown), for the account information to be sent to frontend application 102A for use in a transaction, and for the transaction to be recorded and apportioned properly.

Depicted in FIG. 1 is one embodiment of shared voting system 100, to which there are alternative embodiments. For example, each instance of the suffix reference numeral "N" can represent a numerical value, such as 14, or any other natural number (including 1). Furthermore, there can be different numbers of users 106A-106N than there are of credit providers 112A-112N. For another example, backend application 104 can be run using a cloud computing environment.

Figure 2:
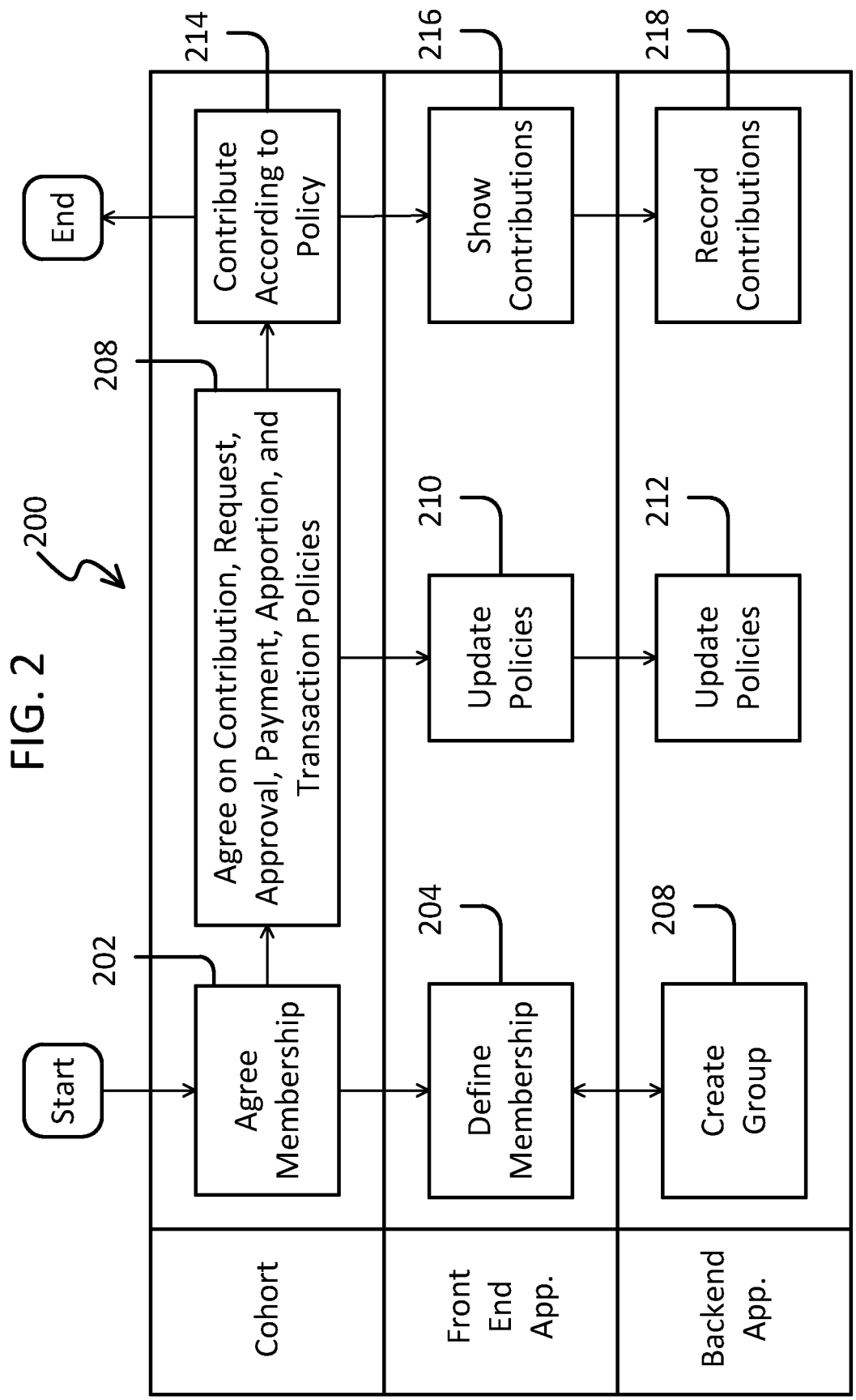
FIG. 2 shows a flowchart of a method of initializing the shared voting system for accounting according to embodiments of the present disclosure.

FIG. 2 shows a flowchart of method 200 of initializing shared voting system 100 for accounting according to embodiments of the present disclosure. Method 200 can be implemented using shared voting system 100, so this discussion will employ some of the elements and reference numerals of FIG. 1. However, method 200 may be implemented on a different shared voting system (not shown).

In the illustrated embodiment, at box 202, users 106A-106N agree to form cohort 106. At box 204, each user 106A-106N uses frontend application 102 to identify themselves (e.g., by legal name, screen name, avatar, etc.) and request entry into cohort 106. At box 206, a group is created in backend application 104 to represent cohort 106. Then at box 204 again, a list of members of the group can be presented to cohort 106.

At box 208, cohort 106 sets forth and agrees upon a contribution policy, a request policy, an approval policy, a payment policy, an apportion policy, and a transaction policy. Each of these policies set forth rules by which shared voting system 100 will operate, and different policies can have the same, similar, divergent, or different rules. The policies can be implemented in contribution module 114, request module 116, approval module 118, payment module 120, apportion module 122, and transaction module 124, respectively. At box 210, these policies are created and/or updated in frontend application 102, and at box 212, these policies are created and/or updated in backend application 104.

In some embodiments, the contribution policy includes rules regarding how users 106A-106N contribute to the JFA ("joint financial account"), and the request policy includes rules regarding how users 106A-106N ask permission to use funds from the JFA. The approval policy includes rules regarding how permission is granted to a fund request, and the payment policy includes rules regarding how the funds are issued to pay for the approved request. The apportion policy includes rules regarding how the expended funds are assessed amongst cohort 106, and the transaction policy includes rules regarding longitudinal record keeping of the contributions to and apportions from the JFA of cohort 106.

Returning to method 200, at box 214, users 106A-106N contribute value to the JFA according to the contribution policy. At box 216, frontend application 102 shows each user 106A-106N their own contribution and can also show the contributions of some or all of cohort 106 (individually and/or in total), and/or the current balance of the JFA. At box 218, the contributions of cohort 106 are recorded in a transaction log (not shown).

In some embodiments, the contribution policy can specify what type of value that shall be provided by each user 106A-106N, for example, cash money, securities, credit, and/or collateral. The policy can also specify the absolute amount or relative amount of value that shall be provided by each user 106A-106N individually. For example, the contribution policy may state that each user 106A-106N initially contributes $100 or that each user 106A-106N contributes the same amount with that amount being an established goal, such that each individual contribution can be calculated by simple division. For another example, user 106C may be required to provide twice as much as the other users 106A-106N, or user 106C may be required to provide all of the funds for cohort 106. In some contexts, for example, the funds may come from a source that is outside of cohort 106. In such an embodiment, the initial contribution by cohort 106 is nil, although subsequent contributions from cohort 106 may occur and would be governed by the contribution policy.

The process of method 200 allows for the formation of cohort 106 by individual users 106A-106N. In addition, rules are set up, agreed to, and recorded regarding the operation of the JFA. This includes the initial funding of the JFA so that it can be subsequently used.

Figure 3:
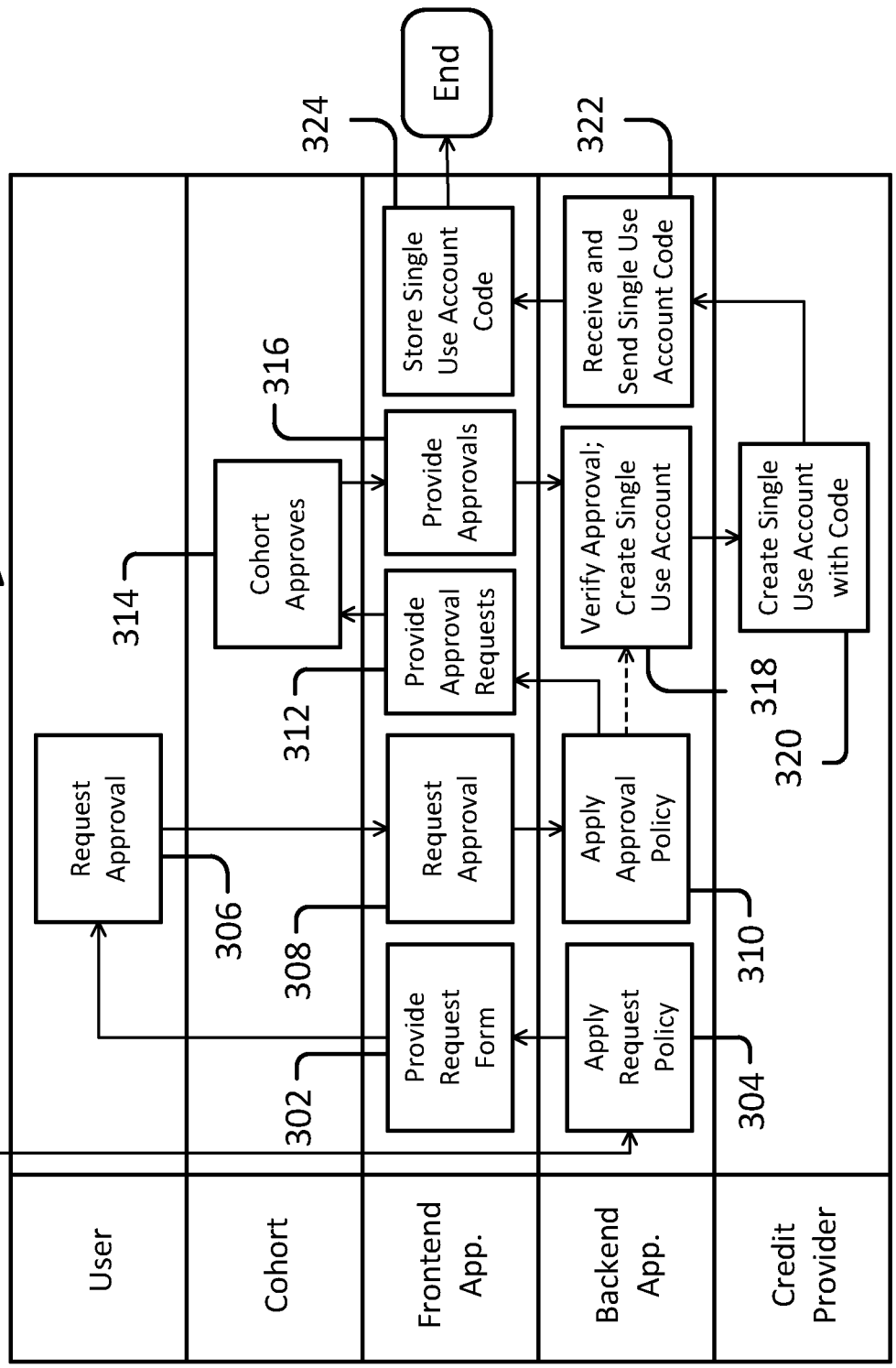
FIG. 3 shows a flowchart of a method of approving a transaction in the shared voting system for accounting according to embodiments of the present disclosure.

FIG. 3 shows a flowchart of method 300 of approving a transaction (e.g., a financial expenditure) in shared voting system 100 for accounting according to embodiments of the present disclosure. Method 300 can be implemented using shared voting system 100, so this discussion will employ some of the elements and reference numerals of FIG. 1. However, method 300 may be implemented on a different shared voting system (not shown).

In the illustrated embodiment, at box 302, the request policy is applied by the backend application, and at box 304, the request form is provided to user 106D (for example) via frontend application 102D. At box 306, user 106D fills in the request for approval of an expenditure from the JFA using device 108D, and this request is received by frontend application 102. At box 308, frontend application 102 sends the request and requests approval thereof to backend application 104.

In some embodiments, the request policy can specify dates, times, and/or geographic locations at which requests can be made, and it can prevent requests from being made for excluded dates, times, and/or locations. The request policy can set forth a minimum account balance threshold which the JFA must meet or exceed for a request to be entered. The request policy can specify whom in cohort 106 is eligible to make a request and can allow an ineligible user 106E (for example) to make a request if they are in geographic proximity to user 106D.

The request policy can also specify what information can be provided and what information needs to be provided in a request and/or provide a form with editable blanks for the request (such as formatted text or freeform text). For example, the request may require a specific or approximate transaction amount, an actual or anticipated transaction date, other party/parties to the transaction or recipient of the funds, and/or an expense type or code. These values may also be in the form of drop-down menus. In such an embodiment, the options in each drop-down menu may be dynamically editable depending on the situation at hand. For example, different users 106A-106N may have different options, or the options may change according to JFA balance, time, date, location of user 106D, and/or proximity of user 106D to some or all of cohort 106.

Returning to method 300, at box 310, the approval policy is applied to determine which criteria need to be satisfied in order for the request to be approved. In some situations, approval is required by some or all of cohort 106. In such situations, the approval requests are sent to and received by frontend application 102, at box 312, and are provided to the selected users 106A-106N. In some situations, all of the approval requests are sent simultaneously so that the approvals can be issued in parallel, possibly shortening the time to approval. In other situations, the approval requests are sent in series, or the approval requests can be sent in a combination of parallel and series for the various selected users 106A-106N. As approvals are issued by cohort 106 at box 314, then at box 316, the approvals received by frontend application 102 are provided to backend application 104. At this time, method 300 proceeds to box 318, but in some situations, the criteria for approval of a request do not require voting by cohort 106. In such situations, method 300 moves from box 310 directly to box 318, bypassing boxes 312-316.

In some embodiments, the criteria in the approval policy which are required for approval of a request can be based on: 1) the voting of some or all of cohort 106, 2) the transaction amount, 3) the location of the request, 4) the proximity of the request to some or all of cohort 106, 5) the location of the transaction, 6) the proximity of the transaction to some or all of cohort 106, 7) the time and/or date of request, 8) the time and/or date of transaction, 9) the relative time and/or date of request, and/or 10) the relative time and/or date of transaction. Furthermore, a combination of these or other factors can occur, which may increase or decrease the difficulty of approval accordingly between no approvals required up to requiring a complete consensus (i.e., unanimity) of cohort 106.

For examples of factor #1, a request may require a predetermined percentage of cohort 106 to approve wherein each user 106A-106N have equal voting shares; a request may require a certain percentage votes of a select group of cohort 106 (e.g., a committee), a request may require a certain number of voting shares where different users 106A-106N have different numbers of voting shares (e.g., regular members each have one voting share but officers have four voting shares). In these embodiments, the approval voting shares may be the important shares to garner, although, there may be embodiments where disapproval voting shares are important to avoid. Any of the previous examples can be adapted, for example, to require that a predetermined percentage of voting shares not be for disapproval. In such embodiments, such "nay" votes can lead to the disapproval of a request, thus ending method 300. For examples of factor #2, the transaction amount may change the percentage of voting shares required to approve the request by reducing or eliminating the percentage with small transactions, or by increasing it to a complete consensus of cohort 106 with a very large transaction.

For examples of factor #3, there may be a whitelist and/or a blacklist of request locations at which expenditure requests are automatically approved (e.g., at a company retreat) or disapproved (e.g., a particular foreign country). Request location can also change the approval criteria, such as the percentage of voting shares required to approve a request (e.g., the percentage may go down if the request is made at the headquarters for cohort 106). For an example of factor #4, if the request is made by user 106E (for example) and user 106F (for example) is in close proximity (for example, within 15 m or 49 ft. or in the same room), then the percentage of voting shares required to approve the request may go down and/or the vote of user 106F is assumed to be "yea". For examples of factor #5, there may be a whitelist and/or a blacklist of transaction locations at which expenditure requests are automatically approved (e.g., at a necessary services provider, such as a public utility) or disapproved (e.g., at a retail clothing store). Transaction location can also change the approval criteria, such as the percentage of voting shares required to approve a request (e.g., the percentage may go down if the transaction is at an office supply store). For an example of factor #6, if user 106G (for example) requests a transaction that is proximate (for example, within 150 m or 490 ft. or in the same building) to user 106H (for example), then the percentage of voting shares required to approve the request may go down and/or the vote of user 106H is assumed to be "yea". This can be advantageous in the situation where user 106H cannot make expenditure requests.

For examples of factor #7, the time and/or date of request may change the percentage of voting shares required to approve the request by decreasing the percentage for requests made during the work day or near or on the last day of the month, quarter, and/or year. Similarly, for examples of factor #8, the time and/or date of the transaction may change the percentage of voting shares required to approve the request by decreasing the percentage for transactions occurring during the work day or near or on the last day of the month, quarter, and/or year. For an example of factor #9, relative time and/or date of request may change the percentage of voting shares required to approve the request by analyzing prior approved transactions. If user 106I (for example) is making a series of requests for a regularly scheduled delivery of a consumable good, then the first request may be subject to the standard voting share threshold, but the percentage of voting shares required to approve the subsequent requests may go down and/or the voting shares from the first request may be assumed to be the same for the subsequent requests. For an example of factor #10, relative time and/or date of transaction may change the percentage of voting shares required to approve the request by analyzing prior approved transactions. If an expenditure for a flight for user 106J (for example) is requested and approved, and subsequently a request for a hotel room on the same day at the destination is made, then the percentage of voting shares required to approve the subsequent requests may go down and/or the voting shares from the flight request may be assumed to be the same for the hotel room.

Returning to method 300, at box 318, backend application 104 receives the (approval and/or disapproval) voting shares and verifies approval of the request according to the approval policy. If the request has been approved, then backend application 104 creates a SUA ("single-use account") for the approved transaction and communicates with credit provider 112A (for example) to assign a portion (or all) of the credit and/or funds in the JFA to the SUA. Backend application 104 also requests an account code for accessing the SUA. On the other hand, if the request has not been approved, backend application 104 can wait to receive more voting shares, or, if the request has reached its deadline for approval or has been explicitly disapproved according to the approval policy, then method 300 ends without the creation of the SUA.

In the illustrated embodiment, at box 320, credit provider 112A generates the SUA with an account code to access the SUA. In some embodiments, the SUA is a new single-use line of credit or "credit card", and in other embodiments, the SUA is a new, single-use bank account. At box 322, backend application 104 receives, stores, and sends the account code to frontend application 102. At box 324, frontend application 102 receives and stores the account code. At this point, frontend application 102 can allow access to the account code by some or all of cohort 106. In some embodiments, only one of users 106A-106N will be allowed access to the account code because that user is, for example, the requestor of that transaction. In some embodiments, only one of users 106A-106N will be allowed access to the account code because that user is, for example, the designated treasurer or purchaser of cohort 106. In such embodiments, the user having access to the account codes would not change between transactions.

The process of method 300 allows for cohort 106 to make and respond to a request for a financial transaction. Furthermore, the process can be streamlined and still provide adequate oversight due to the ability for the number of approvals required for a given transaction to be tailored to the situation at hand. In addition, the ability for approvals to be provided in parallel can eliminate bottlenecks and unnecessary delays in the process.

Figure 4:
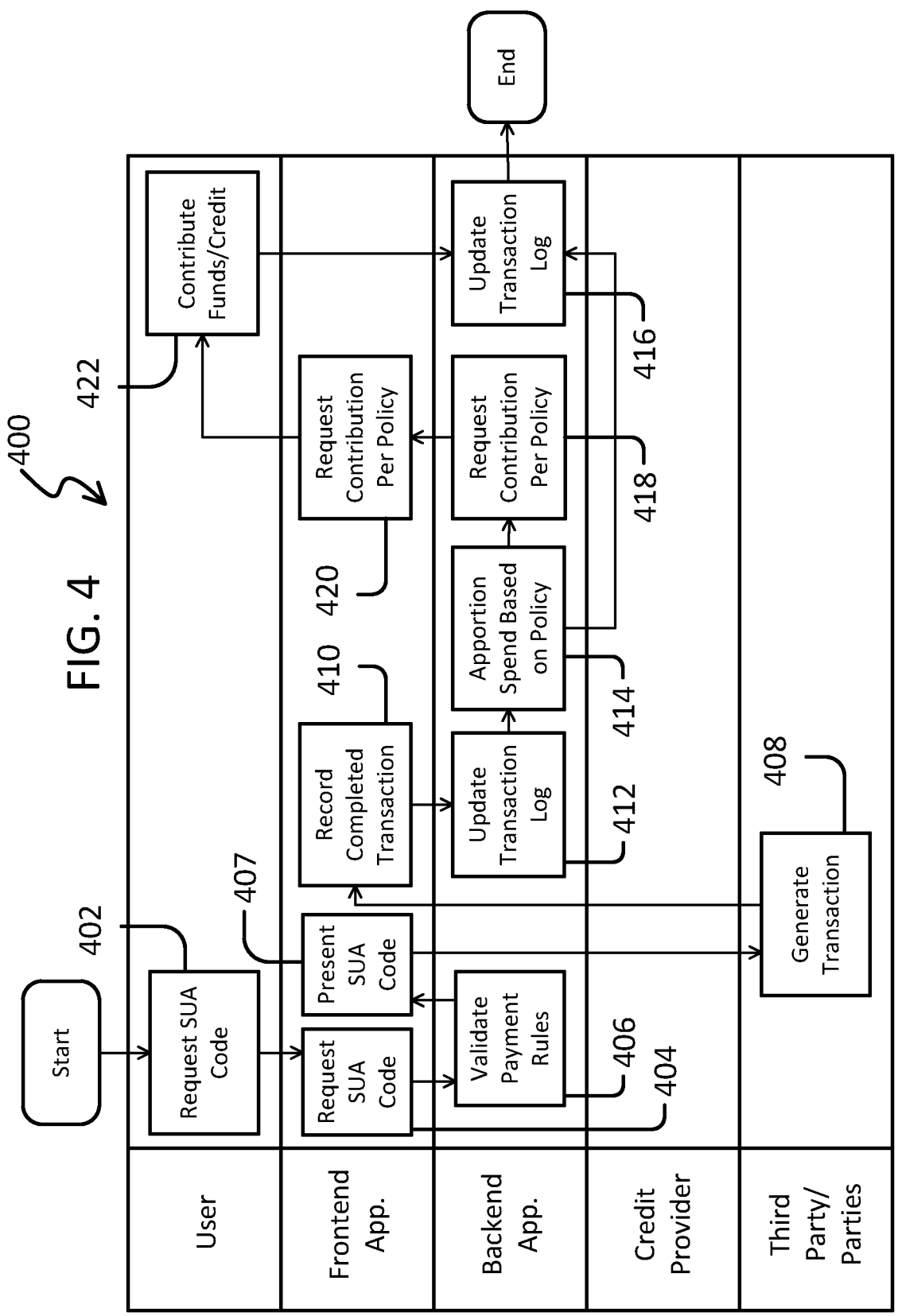
FIG. 4 shows a flowchart of a method of completing a transaction and replenishing an account in the shared voting system for accounting according to embodiments of the present disclosure.

FIG. 4 shows a flowchart of method 400 of completing a financial transaction (e.g., an expenditure) and replenishing an account in shared voting system 100 for accounting according to embodiments of the present disclosure. Method 400 can be implemented using shared voting system 100, so this discussion will employ some of the elements and reference numerals of FIG. 1. However, method 400 may be implemented on a different shared voting system (not shown). In some embodiments, method 400 can start after the completion of method 300 (shown in FIG. 3).

In the illustrated embodiment, at box 402, user 106K (for example) decides to complete the transaction using the SUA. At box 404, user 106K uses frontend application 102K (for example) to request permission to use the account code for the SUA. At box 406, backend application 104 verifies that the transaction is in accordance with the payment policy, and if so, backend application 104 sends permission for use of the SUA code to frontend application 102K. In some embodiments, the payment policy specifies the form of payment. For example, the funds in the SUA can be transferred by a credit card account, debit card account, wire transfer, social payment service, and/or cryptocurrency. In some embodiments, the payment policy specifies how much of the SUA can be used in a given transaction. For example, the SUA can be used for any amount up to and including the approved expenditure. For another example, the SUA amount can be slightly increased (for example, up to 10%) to ensure completion of a transaction. For yet another example, a minimum amount of the SUA must be spent in a given transaction (for example, over 90%). In some embodiments, the payment policy may require criteria to be satisfied in order for frontend application 102K to receive the SUA code. For example, frontend application 102K must have been used to request the SUA. For another example, user 102K must be designated as an authorized user of the SUA code. For further examples, the criteria can be similar or the same as those involved with the request policy and/or the approval policy, such as the voting of some or all of the plurality of users, the transaction amount, the location of the code request, the proximity of the code request to some or all of the plurality of users, the location of the transaction, the proximity of the transaction to some or all of the plurality of users, the time and/or date of the code request, the time and/or date of the transaction, the relative time and/or date of code request, and the relative time and/or date of transaction At box 407, frontend application 102K receives permission and presents the account code for the SUA. At box 408, the third party/parties to the transaction (e.g., a merchant or service provider) generates the transaction and receives payment from the SUA. At box 410, frontend application 102K records the completed transaction, and at box 412, backend application 104 updates the transaction log to record the final details of the transaction according to the transaction policy. [the transaction policy includes rules regarding longitudinal record keeping of the contributions to and apportions from the JFA of cohort 106.] In some embodiments, the transaction policy specifies what details of the transaction is recorded (such as the requesting user, the amount, the transacting user, the other party/parties, etc.). In some embodiments, the transaction policy specifies who of cohort 106 can view the transaction or the transaction details. In some embodiments, the transaction policy specifies that a blockchain be used for record keeping.

At box 414, backend application 104 apportions the expenditure amongst cohort 106 according to the apportion policy, and at box 416, the transaction log is updated again accordingly. [The apportion policy includes rules regarding how the expended funds are assessed amongst cohort 106.] In some embodiments, the cost is assessed to the requesting user. In some embodiments, the cost is assessed to the transacting user. In some embodiments, the cost is assessed evenly amongst cohort 106. In some embodiments, the transacting user can enter an apportionment into frontend application 102 that can be agreed upon by all other users named in the apportionment. In some embodiments, the apportion policy treats different types of transactions differently. For example, a food and/or beverage expenditure may be assessed to the transacting user and any proximate users, whereas a software expenditure may be assessed to the information technology committee (i.e., a subset of cohort 106).

At box 418, backend application sends a request for contributions to the JFA from cohort 106 to frontend application 102 according to the contribution policy. At box 420, frontend application 102 delivers the requests to the appropriate user(s), who then contribute to the JFA at box 422. From there, at box 416, the transaction log is updated again accordingly.

While the contribution policy has been previously discussed with respect to box 214 in FIG. 2, in some embodiments the replenishment or reimbursement contributions made at box 420 can be governed separately from the aforementioned initial contributions. [the contribution policy includes rules regarding how users 106A-106N contribute to the JFA] In some embodiments, the contribution policy can specify what type of value that shall be provided by each user 106A-106N, for example, cash money, securities, credit, and/or collateral. The policy can also specify the absolute amount or relative amount of value that shall be provided by each user 106A-106N individually. For example, the contribution policy may state that each user 106A-106N shall reimburse the JFA for any expenses attributed to themselves, respectively. For another example, the contribution may state that each user 106A-106N shall contribute an equal share to reimburse the JFA for each expenditure. For another example, user 106L may be required to provide twice as much as the other users 106A-106N, or user 106L may be required to provide all of the funds for cohort 106. In some contexts, for example, the funds may come from a source that is outside of cohort 106.

The process of method 400 allows for a transaction to be carried out, recorded, apportioned, and reimbursed. More specifically, the use of a SUA allows for expenses to be paid for while restricting access to the funds of the JFA. In addition, access to the SUA itself can be controlled. The recording of the transaction allows for longitudinal tracking of the spending of users 106A-106N over a span of time (and transactions).

The following are two examples of the operation of shared voting system 100 (shown in FIG. 1) and methods 200, 300, and 400:

Example #A

Bob, Jane, Bruce, and Elmer form a cohort. Each member of the cohort contributes $100 to the joint financial account, and each member is allocated one voting share. The cohort agrees on an approval policy that requires three voting shares for approval of an expenditure, along with a payment policy that requires two voting shares as long as those two voting members are in the same location.

One evening, a dinner is arranged for Bob, Jane, and Bruce and the approval for the dinner is $200, and the SUA is set up accordingly. Jane has to rush home right after dinner and the three agree to her portion being $50 while Bob and Bruce's portions being $75 each (because they are staying and ordering more drinks). When Bruce goes to pay the bill, he taps his phone with Bob to prove the physical proximity, which allows his device to receive the SUA code and pay the bill. [End of Example #A]

Example #B

Barb, Jack, Betty, and Elise all work for a company but are in different business units. Within the company, the CFO has defined the approval policy such that approval for an expenditure of less than $500 needs a single voting share, a $500-$2,500 expenditure needs three voting shares, a $2,500-$10,000 expenditure needs eight voting shares, and a $10,000-$100,000 expenditure needs eight voting shares from Cohort A (business unit members) and three voting shares from Cohort B (finance team members). The approval policy also states that senior managers are granted 3 voting shares and executives are granted 8 voting shares.

Barb, Jack, Betty, and Elise going to a conference, so they have costs associated with the trip, such as $2800 for airfares, $2300 for accommodations, and $300 for an end-of-event dinner. This system enabled the non-sequential approval flow between these groups. Rather than the traditional model of the group having to chase down approvals sequentially (when the next persons doesn't see or look at the request until it is their turn), all of the required approvers are notified immediately and can act in parallel, thus shortening the overall approval time. The system however still supports a final level approver that only approves after all other groups (if needed), which in this example can be the financial controller. [End of Example #B]

It is understood in advance that although this embodiment includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
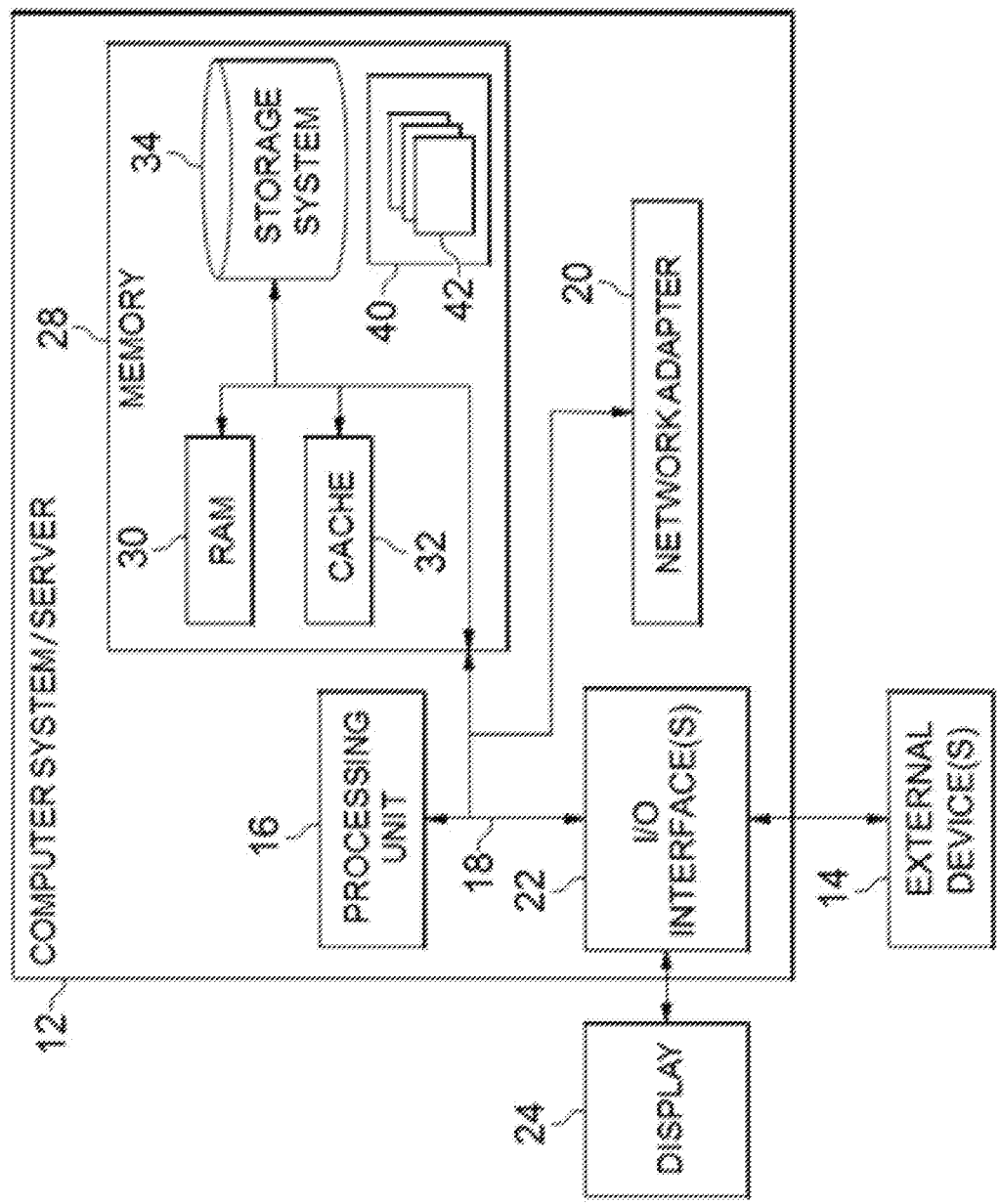
FIG. 5 shows a cloud computing node according to embodiments of the present disclosure.

Referring now to FIG. 5, a schematic of an example of a cloud computing node is shown. Cloud computing node is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node is shown in the form of a general-purpose computing device. The components of computer system/server 12 may include, but are not limited to, one or more processors or processing units 16 (although only one is depicted in FIG. 5), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
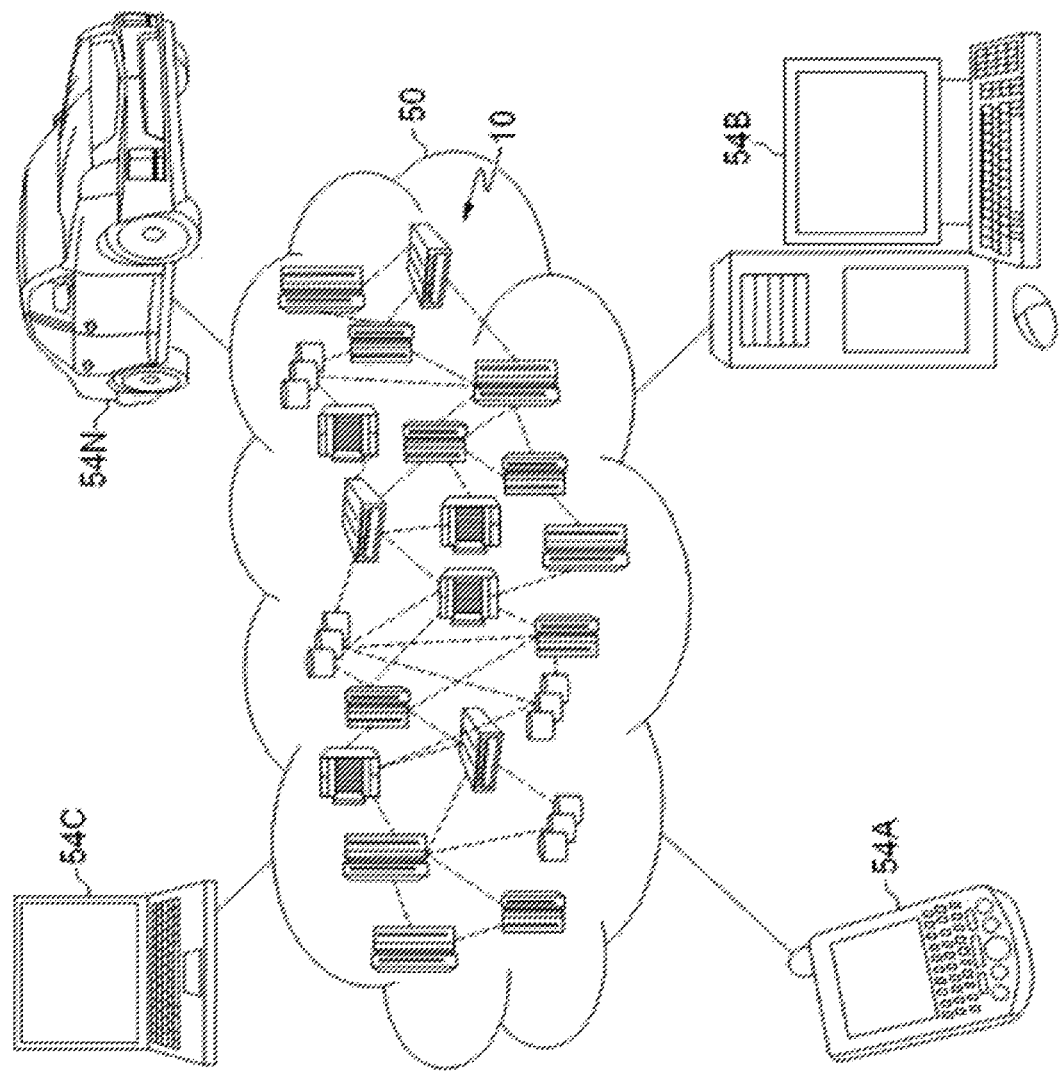
FIG. 6 shows a cloud computing environment according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 7:
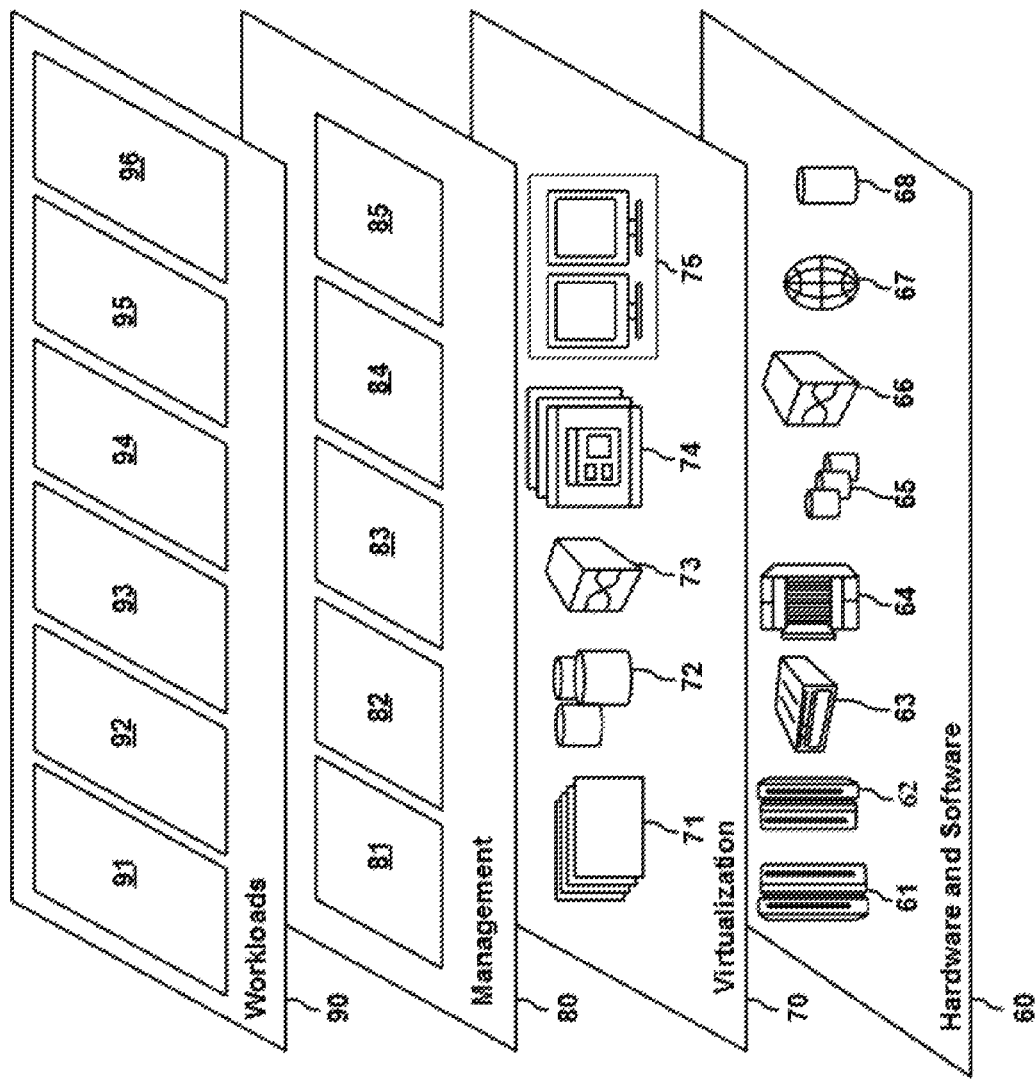
FIG. 7 shows abstraction model layers according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and accounting 96 via shared voting system 100 (shown in FIG. 1).

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing, by a first instance of a plurality of instances of a frontend computer application running on a first computing device, a form for a request for a transaction, the form including a blank with a drop-down menu for entering information for the request, wherein each of a plurality of users has a respective computing device that is associated with a respective instance of the plurality of instances of the frontend computer application;
editing, dynamically, a subset of options from a set of predetermined options for the drop-down menu based on a proximity of a user of the first computing device to some or all of the plurality of users;
receiving, by a backend computer application running on a second computing device, the request from the first instance of the frontend computer application;
applying, by the backend computer application, an approval policy to the request, wherein the approval policy comprises a set of criteria;
determining, by the backend computer application, whether the set of criteria requires voting by some or all of the plurality of users for approval of the request;
providing approval requests to a selected portion of the plurality of instances of the frontend computer application running on a plurality of other computing devices based on the approval policy in response to the set of criteria requiring voting;
determining, by the backend computer application, that the request is approved according to the approval policy;
creating, by the backend computer application, a single-use account;
requesting, by the backend computer application, a single-use code for the single-use account from a financial institution;
receiving, by the backend computer application, the single-use code; and
sending, by the backend computer application, the single-use code to the first instance of the frontend computer application.

2. The method of claim 1, further comprising:
apportioning, by the backend computer application, the transaction amongst a plurality of users according to an apportion policy.

3. The method of claim 2, further comprising:
requesting, by the frontend computer application, a contribution to the financial institution from at least one of the plurality of users according to a contribution policy.

4. The method of claim 1, further comprising:
recording, by the backend computer application, a contribution to the financial institution.

5. The method of claim 1, wherein the set of criteria is based on at least one of a second group consisting of: voting of some or all of a plurality of users, a transaction amount, a location of the request, a location of the transaction, a time and/or date of the request, a time and/or date of the transaction, a relative time and/or date of request, and a relative time and/or date of transaction.

6. The method of claim 1, wherein the determining of the request approval comprises:
receiving, by the backend computer application, a voting share from one of the selected portion of the plurality of instances of the frontend computer application.

7. The method of claim 1, wherein the single-use account can be used for no more than an amount of the expenditure.

8. A method comprising:
providing, by a first instance of a plurality of instances of a frontend computer application running on a first computing device, a form for a request for a transaction from a first user of a plurality of users, wherein each of the plurality of users has a respective computing device that is associated with a respective instance of the plurality of instances of the frontend computer application, the form including a blank with a drop-down menu for entering information for the request;
editing, dynamically, a subset of options from a set of predetermined options for the drop-down menu based on a proximity of a user of the first computing device to some or all of the plurality of users;

requesting, by the first instance of the frontend computer application, approval for the transaction from a backend computer application running on a second computing device in response to the backend computer application having:

applied an approval policy to the request, wherein the approval policy comprises a set of criteria;

determined whether the set of criteria requires voting by some or all of the plurality of users for approval of the request;

provided approval requests to a selected portion of the plurality of instances of the frontend computer application running on a plurality of other computing devices based on the approval policy in response to the set of criteria requiring voting;

receiving and storing, by the first instance of the frontend computer application, a code for a single-use account from the backend computer application, wherein the single-use account originates from a financial institution in communication with the backend computer application;

presenting, by the first instance of the frontend computer application, the code for completing a transaction; and recording, by the first instance of the frontend computer application, the completed transaction.

9. The method of claim 8, wherein the set of criteria is at least one of a second group consisting of: voting of some or all of the plurality of users, a transaction amount, a location of the request, a location of the transaction, a time and/or date of the request, a time and/or date of the transaction, a relative time and/or date of request, and a relative time and/or date of transaction.

10. The method of claim 8, wherein one of the approval requests was sent to a second user, and the method further comprises:

receiving, by the frontend computer application, a voting share from the second user approving the transaction; and providing, by the frontend computer application, the voting share from the second user to the backend computer application.

11. The method of claim 8, further comprising:

requesting, by the frontend computer application, that a third user contributes to the financial institution according to a contribution policy.

12. The method of claim 8, further comprising:

apportioning, by the backend computer application, the transaction amongst the plurality of users according to an apportion policy.

13. The method of claim 8, wherein the single-use account can be used for no more than an amount of the expenditure.

14. A system comprising a first computing device communicatively connected to a second computing device, wherein:

the first computing device comprises a first processor configured to:

provide a form for a request for a transaction to a user of a plurality of users, the form including a blank with a drop-down menu for entering information for the request, wherein the first computing device includes an instance of a frontend computer application, wherein other users of the plurality of users have other computing devices that include other instances of the frontend computer application;

edit, dynamically, a subset of options from a set of predetermined options for the drop-down menu based on a proximity of a user of the first computing device to some or all of the plurality of users;

receive the request from the user;

request approval for the transaction from the second computing device;

receive and store a single-use code for a single-use account from the second computing device, wherein the single-use account originates from a financial institution in communication with the second computing device;

present the code for completing a transaction; and record the completed transaction; and the second computing device comprises a second processor and a first memory and is communicatively connected to the financial institution, and the second processor is configured to:

receive the request for the transaction from the first computing device;

apply an approval policy to the request, wherein the approval policy comprises a set of criteria;

determine whether the set of criteria requires voting by some or all of the plurality of users for approval of the request;

provide approval requests to a selected portion of the plurality of instances of the frontend computer application running on a plurality of other computing devices based on the approval policy requiring voting;

determine that the request is approved according to the approval policy;

create the single-use account;

request the single-use code for the single-use account from the financial institution;

receive the single-use code; and send the single-use code to the first computing device.

15. The system of claim 14, wherein the first memory is further configured to store:

a contribution policy; and an apportion policy.

16. The system of claim 14, wherein the set of criteria is based on at least one of a second group consisting of: voting of some or all of the plurality of users, a transaction amount, a location of the request, a location of the transaction, a time and/or date of the request, a time and/or date of the transaction, a relative time and/or date of request, and a relative time and/or date of transaction.

17. The system of claim 15, wherein the first is memory configured to store:

a request policy;

a payment policy; and a transaction policy.

18. The system of claim 17, wherein the request policy is based on at least one of the group consisting of: a request eligibility, an account balance, a time, a date, a location of the user, and proximity of the user to some or all of the plurality of users.

19. The system of claim 17, wherein the second processor is further configured to:

apportion the transaction amongst the plurality of users according to an apportion policy.

* * * * *